(Model.)
G. DERBY.
MILL BURR.
No. 246,476. Patented Aug. 30, 1881.
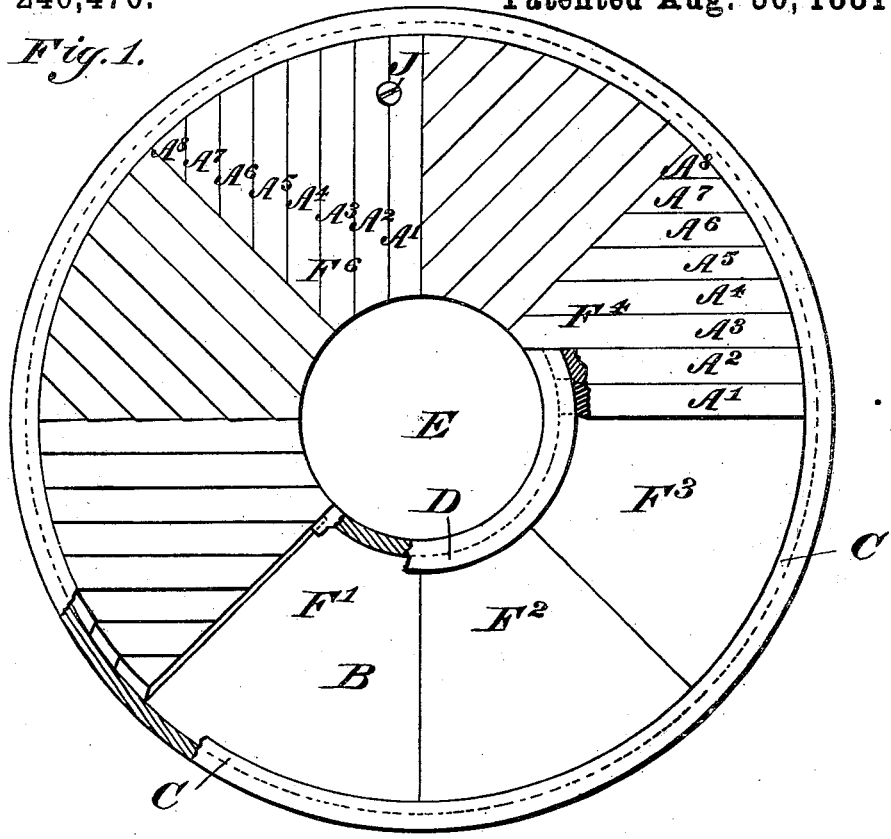
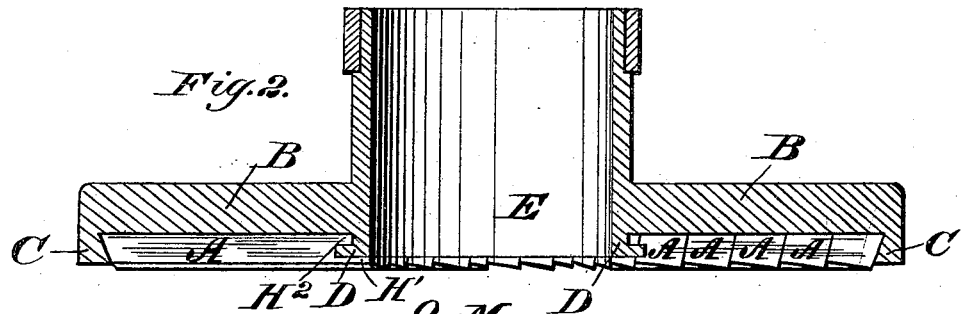
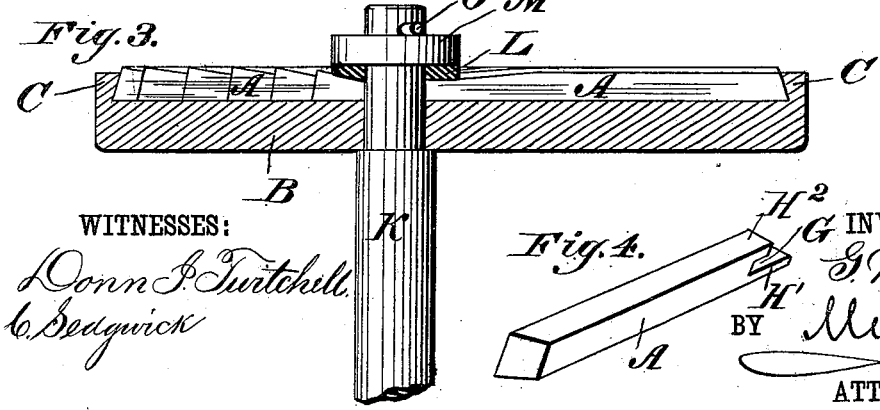
WITNESSES:
Donn J. Tutchell
C. Sedgwick
INVENTOR:
G. Derby
BY Munn & Co
ATTORNEYS.

UNITED STATES PATENT OFFICE.

GEORGE DERBY, OF NEW YORK, N. Y.

MILL-BURR.

SPECIFICATION forming part of Letters Patent No. 246,476, dated August 30, 1881.

Application filed September 13, 1880. (Model.)

*To all whom it may concern:*

Be it known that I, GEORGE DERBY, of the city, county, and State of New York, have invented a new and Improved Mill-Burr, of which the following is a specification.

The object of my invention is to provide a new and improved mill-burr which is simple in construction, is durable, and can be easily sharpened.

In the accompanying drawings, Figure 1 is a plan view of my improved mill-burr, showing some of the teeth secured in their proper position. Fig. 2 is a cross-sectional elevation of the same. Fig. 3 is a cross-sectional elevation of a like burr, showing a modification in attaching the teeth. Fig. 4 is a detail perspective view of one of the teeth of my improved mill-burr.

The steel teeth A are placed upon a circular plate, B, provided with a peripheral flange, C, beveled toward the periphery on the inner side, and with a grooved flange, D, at the eye E.

The plate B is divided into a series of wedge-shaped segments, $F'$ $F^2$, &c., each segment containing a certain number of teeth, A. The teeth A consist of quadrangular bars of steel of varying length, according to their position, and are all beveled in the same direction on their upper surface, so that one edge is higher than the rest and a serrated surface is formed. The longest teeth of each section are beveled at the outer ends to fit against the inner beveled side of the flange C, whereas the inner ends of these teeth are provided with a horizontal groove, G, which forms two projections, $H'$ and $H^2$, of which $H^2$ fits into the groove of the flange D, whereas the projection $H'$ overlaps this flange. The shorter teeth are only chamfered at the inner ends, to fit against the end tooth of the other section; but the outer end is also beveled to fit against the beveled inner side of the flange C.

To attach the teeth to the plate B, one of the teeth—for instance, $A'$ of the section $F^4$—is placed upon one of the radial lines designating the end of a section, its beveled end resting against the beveled inner side of the flange, and its grooved end fitting against the grooved flange D, upon which the other teeth, $A^2$ and $A^3$, are laid parallel with the tooth $A'$, the length of tooth $A^3$ being so adjusted that its inner end will rest partly against the first tooth of the next section. In this manner all the teeth are attached to the plate B, excepting those of the last section, $F^6$, for in that case the smallest tooth, $A^8$, is placed in position first, then the next largest, and the radial tooth $A'$ is placed in position last. An aperture is formed in the joint of the teeth $A'$ and $A^2$ of this last section, and these teeth, which are beveled inwardly at the outer end instead of outwardly, like the rest of the teeth, are fastened by means of the screw J, passing through the aperture at the joint and taking in the plate B. The teeth may also be made to extend from the beveled peripheral flange C to the shaft K, against the outer surface of which they closely fit, and may be held in place by the washers L and M, which may be driven down tight upon the inner ends of the teeth A and secured by means of a tapering pin, O, as shown in Fig. 3, or by a wedge or a screw-nut.

Having thus described my invention, what I claim as new, and desire to secure by Letters Patent, is—

1. In combination with the bed-plate B, constructed substantially as shown and described, the teeth A, consisting of quadrangular bars of steel having their upper surfaces and outer ends beveled and their inner ends provided with a horizontal groove, substantially as and for the purpose set forth.

2. In a mill-burr, the circular plate B, having a peripheral flange, C, undercut on the inside, and the grooved eye-flange D, in combination with teeth at one end, fitting under flange C, and at the other provided with projections $H'$ $H^2$, the projection $H'$ overlapping and the projection $H^2$ entering the groove of flange D, as shown and described.

GEORGE DERBY.

Witnesses:
 OSCAR F. GUNZ,
 EDGAR TATE.